2,318,143

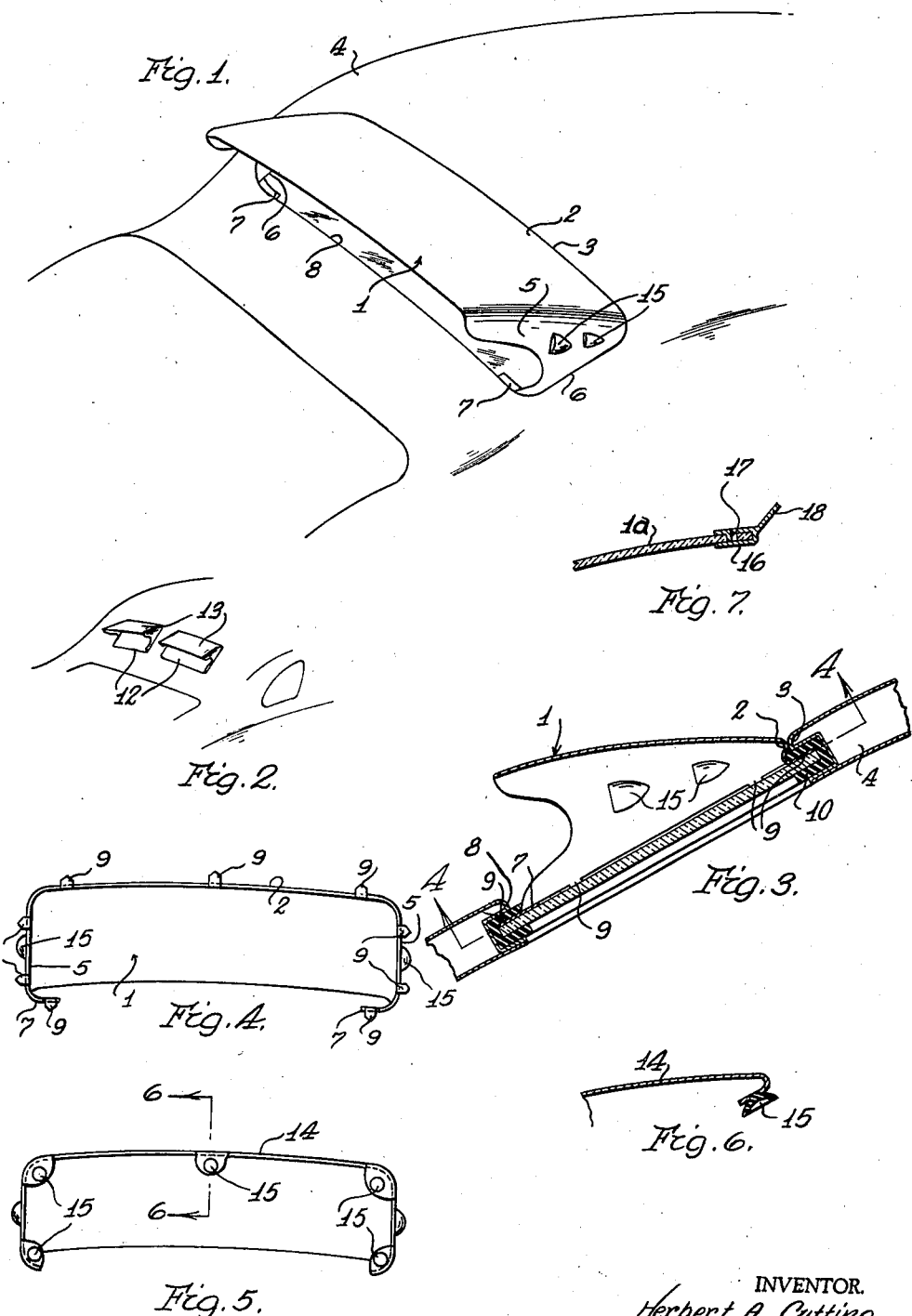
May 4, 1943. H. A. CUTTING 2,318,143
SNOW SHIELD FOR AUTOMOBILE WINDOWS
Filed Oct. 17, 1940
INVENTOR.
Herbert A. Cutting
BY Patented May 4, 1943

UNITED STATES PATENT OFFICE 2,318,143

SNOW SHIELD FOR AUTOMOBILE WINDOWS

Herbert A. Cutting, Detroit, Mich.

Application October 17, 1940, Serial No. 361,512

6 Claims. (Cl. 296—95)

This invention relates to protective devices for the windows of automobiles and has for its primary object to provide means for preventing accumulations of snow on the rear windows of automobiles.

Obviously, accumulations of snow on the rear windows of automobiles obstructs the rear vision of the operators and in some cases is the cause of accidents which otherwise might be avoided. With the present day automobile designs the body contour is such that the rear windows are inclined at an angle more nearly approaching the horizontal than the vertical, and such that snow may readily accumulate thereon. In the case of an automobile having a heated interior the rear window glass is usually at a temperature such that it tends to melt snow which has accumulated on the window, so that if an automobile is parked the snow becomes partially melted. When the interior of the vehicle cools, as a result of being parked for a period of time, the partially melted snow forms a crust which is very difficult to remove. This invention, more specifically stated, has for its primary object to provide a guard or shield for attachment to the vehicle body and adapted when so attached to prevent accumulation of snow thereon, without itself in any way obstructing the rear vision of the operator.

Another object is to provide a guard of the type above referred to having means for detachably mounting it on an automobile in order that it may be quickly and easily assembled in place when weather conditions require its use, and in order that it may be quickly and easily removed when weather conditions are such that its use is unnecessary.

Another object is to provide a guard of the type above referred to which is formed of a transparent plastic material. In the case of sheet metal guards, which the invention also contemplates, they may be painted to match the color of the automobile upon which they are to be used, or they may be painted a neutral color so as to be able to be used with differently colored automobiles. The plastic art has been highly developed and there are many plastics now available on the market and well known which may be used to form the present guard. Such plastics may be obtained in a great variety of colors or they may be clear like glass. Therefore, the selection of colors becomes a matter of personal choice as far as the plastic guard is concerned. The clear or transparent shield will blend with any colored automobile.

In the case of sheet metal guards they may be formed with integral prongs insertable in the window channels as a convenient means for attaching the guides. In the case of plastic guards it is preferred that the prongs be formed in the nature of metal clips which are attached to the guards.

Other objects and advantages will become more fully apparent as reference is made to the accompanying drawing, wherein my invention is illustrated, and in which Fig. 1 is a fragmental perspective view of an automobile with the present invention assembled over the rear window thereof, Fig. 2 is a fragmental perspective view of an automobile having a divided rear window, illustrating the invention applied thereto, Fig. 3 is a vertical section of a window and the guard, Fig. 4 is an elevation of the guard as viewed in the direction of the arrows 4—4 of Fig. 3, Fig. 5 is a view similar to Fig. 4, illustrating a modified attaching means, and Fig. 6 is a fragmental cross section taken on the line 6—6 of Fig. 5.

Fig. 7 is a view illustrating a further modification.

More specifically, I designates a sheet metal guard or shield having a top portion 2 of a contour such that it fits within the upper edge of the rear window opening 3 of an automobile 4. Integral with the portion 2 are two side portions 5 adapted to fit the sides 6 of the window opening. The side portions 5 have integral portions 7 bent inwardly to fit within the bottom edge 8 of the window opening. The top, side and bottom portions 2, 5 and 7 respectively are all formed with upstanding prongs 9.

The conventional automobile window is mounted in a resilient channel such as shown at 10 in Fig. 3. In assembling the shield the prongs 9 are slipped between the glass 11 and the rubber channels 10. This operation is possible because the shield is composed of resiliently flexible material and is, therefore, capable of being compressed for insertion within the window opening. Inasmuch as all four sides of the window opening are engaged when the shield is released and permitted to expand from its compressed condition, the shield is firmly held in place. It is to be noted, however, that the legs 7 may be dispensed with in some cases because it has been found that engagement with three sides of the window holds the guard quite firmly.

Fig. 2 illustrates a vehicle having a divided rear window, or what might be termed two windows 12 arranged side by side. Each window has an individual shield 13 constructed according to the explanation above, or according to the modification hereinafter described.

The modified form shown in Figs. 5 and 6 comprises a shield 14 which may be considered as being either of plastic material or of sheet metal, designed to fit within the window opening, and having a multiplicity of rubber suction cups 15 attached thereto. The suction cups are placed in contact with the glass in the rear window and function to hold the shield in place.

To break up eddy currents which are created underneath the shield by movement of the automobile the side portions 5 are formed with louvres 15 which tend to withdraw air from the interior of the shield.

Fig. 7 illustrates a fragment 1a of a shield formed of a plastic material. Secured to an edge of the shield 1a is a metal clip having a channel portion 16 fitting over said edge and retained thereon by a finger 17 which engages in an aperture in the shield member. The clip has a prong 18 adapted to be inserted in a glass receiving channel like the one shown at 10. Obviously, any desired number of clips may be provided on a shield.

Although specific embodiments of the invention have been illustrated and described, it will be understood that various changes may be made within the scope of the appended claims without departing from the spirit of the invention, and such changes are contemplated.

What is claimed is:

1. In combination with an automobile having an inclined rear window composed of a resilient channel with a pane of glass received therein, a shield member having attaching means composed of prong-like members inserted between the glass and a side of the resilient channel for removably holding the shield on the automobile, said shield having a portion extending rearwardly from the upper edge of the window and completely overlying the window, said portion being disposed in a plane substantially horizontal and above the uppermost normal line of vision of the car operator from a rear view mirror located on the header of the car.

2. In combination with an automobile having an inclined rear window composed of a resilient channel with a pane of glass received therein, a shield member having attaching means composed of prong-like members inserted between the glass and a side of the resilient channel for removably holding the shield on the automobile, said shield having a portion extending rearwardly from the upper edge of the window and completely overlying the window, said portion being disposed in a plane substantially horizontal and above the uppermost normal line of vision of the car operator from a rear view mirror located on the header of the car, and said shield having side portions extending rearwardly from the opposite sides of the window.

3. In combination with an automobile having an inclined rear window, a shield member having means for securing it to the automobile and having a portion extending rearwardly from the upper edge of the window, said portion being disposed in a plane substantially horizontal and above the uppermost normal line of vision of the car operator from a rear view mirror located on the header of the car, and being of a length such that it completely overlies the window, and said shield having side portions extending rearwardly from the opposite sides of the window, said side portions being formed with louvres adapted to withdraw air from within the shield incident to movement of the automobile and thereby avoid dead air pockets in the corners of the window and consequent accumulations of snow.

4. In combination with an automobile having an inclined rear window composed of a resilient channel with a pane of glass received therein, a shield member having attaching means composed of prong-like members inserted between the glass and a side of the resilient channel for removably holding the shield on the automobile, said shield having a portion extending rearwardly from the upper edge of the window and completely overlying the window, said portion being disposed in a plane substantially horizontal and above the uppermost normal line of vision of the car operator from a rear view mirror located on the header of the car, and said shield having side portions extending rearwardly from the opposite sides of the window, said side portions being formed with louvres adapted to withdraw air from within the shield incident to movement of the automobile and thereby avoid dead air pockets in the corners of the window and consequent accumulations of snow.

5. In combination with an automobile having an inclined rear window, a shield member having suction cups attached thereto for securing the shield member on the automobile, said shield having a portion extending rearwardly from the upper edge of the window and completely overlying the window, said portion being disposed in a plane substantially horizontal and above the uppermost normal line of vision of the car operator from a rear view mirror located on the header of the car, and said shield having side portions extending rearwardly from the opposite sides of the window, said side portions being formed with louvres adapted to withdraw air from within the shield incident to movement of the automobile and thereby avoid dead air pockets in the corners of the window and consequent accumulations of snow.

6. In combination with an automobile having an inclined rear window composed of a resilient channel with a pane of glass received therein, a shield member having attaching means composed of prong-like members inserted between the glass and a side of the resilient channel for removably holding the shield on the automobile, said shield member being composed of plastic material and said prongs being formed on metal clips attached to said plastic material, said shield having a portion extending rearwardly from the upper edge of the window and completely overlying the window, said portion being disposed in a plane substantially horizontal and above the uppermost normal line of vision of the car operator from a rear view mirror located on the header of the car.

HERBERT A. CUTTING.